Oct. 21, 1958  G. HOPPESCH  2,857,200
RETRACTING MUD FLAP
Filed Jan. 23, 1957  3 Sheets-Sheet 1

Inventor
GUSTAV HOPPESCH

By Hill, Sherman, Meroni, Gross & Simpson
Attys

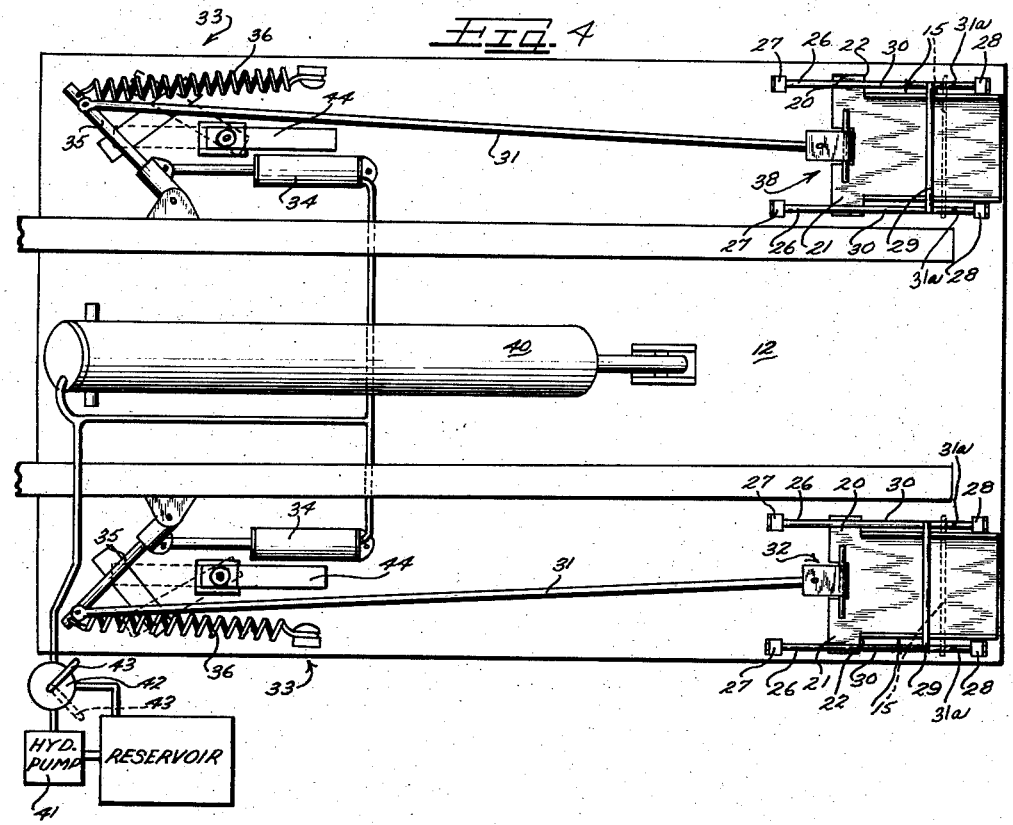
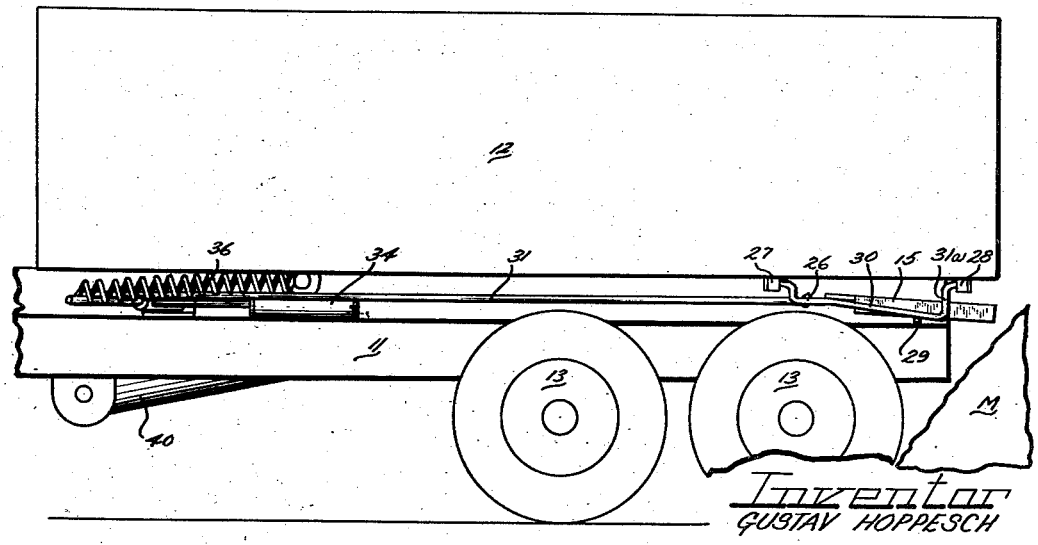

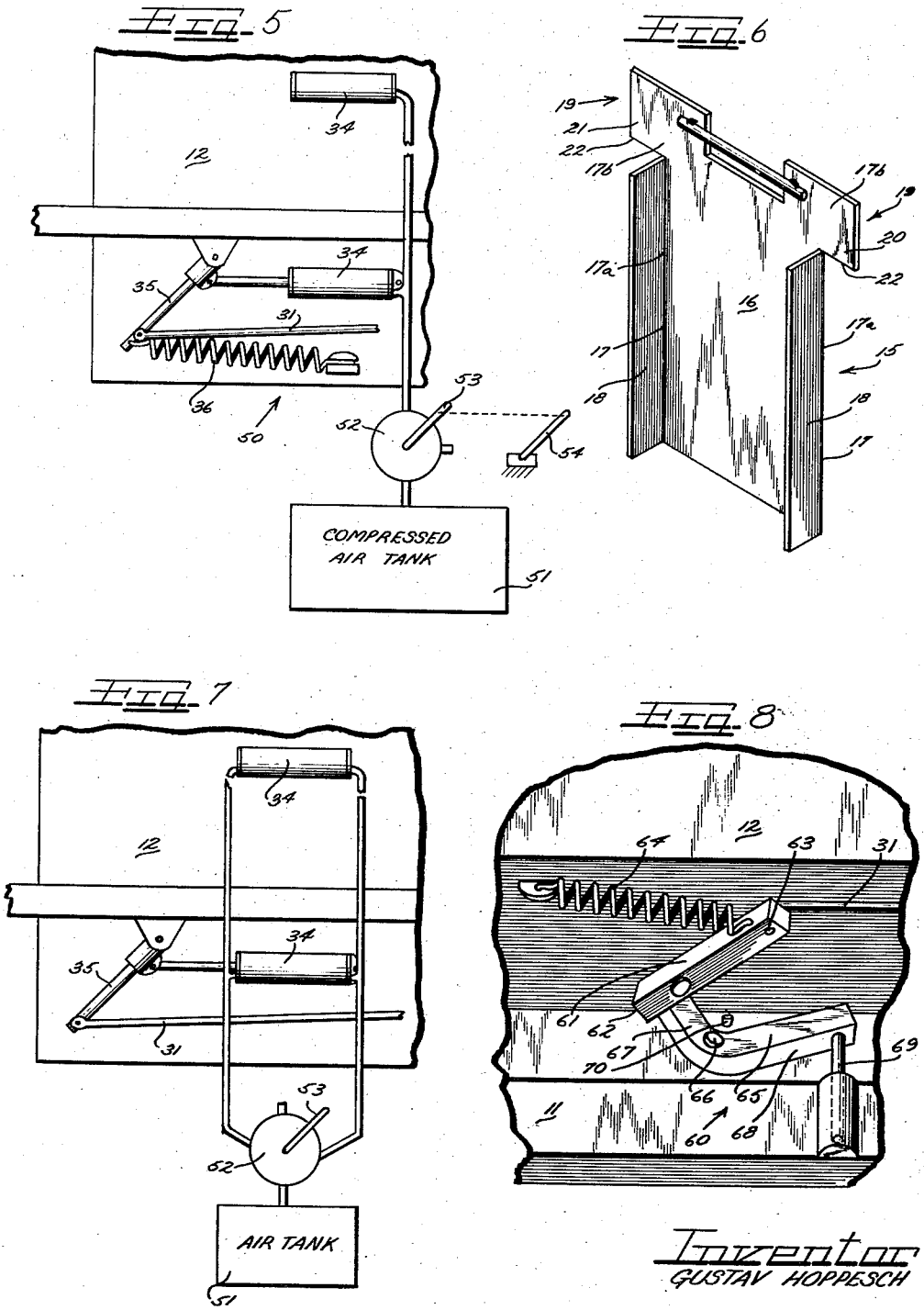

United States Patent Office 2,857,200
Patented Oct. 21, 1958

2,857,200
RETRACTING MUD FLAP

Gustav Hoppesch, Chicago, Ill.

Application January 23, 1957, Serial No. 635,791

11 Claims. (Cl. 298—1)

This invention relates to a mud flap mechanism for a wheeled vehicle together with a method of retracting same.

For some time, it has been common to use mud flaps rearwardly of the rear wheels of a highway vehicle, mud flaps serving as deflectors of mud, gravel, stones and the like which are raised from the surface of the roadway by the wheels of the vehicle. Thus, by these flaps, those following behind are protected against possible injury. Under certain circumstances, it has been desirable in the past to be able to retract the mud flaps, and accordingly such flaps, which have been flexible, have been rendered retractible by one method or another.

The available solutions have been satisfactory until legislation was enacted pertaining to the mud or splash guards used on the rear wheel of trucks. Typical of such legislation is the Uniform Act Regulating Traffic on Highways. Among other things, the act provides that guard means shall be used to prevent the splashing of mud or water upon the windshield of other motor vehicles, and that the splash guard must extend toward the ground and within ten inches from it. The act also includes performance requirements as to "sidethrow or wash of the bulk of the thrown road surface material." The act does not indicate a design or a structure which shall be used to achieve its requirements, but others have found that the act can be complied with if rigid mud or splash guards are utilized.

When rigid splash guards are used, there is a likelihood of their becoming damaged during normal operation of the vehicle. To illustrate, when loaded dump trucks are backed up against a pile of material, the splash or mud guards unintentionally act as a rear bumper, when they engage a pile of material lying on the ground. In so doing, they become damaged and the truck operator not only has a financial loss, but becomes subject to discipline for driving with improper splash guards.

As a solution to the foregoing problem, I have invented a rigid mud flap which may be retracted by the operator in anticipation of his reversely driving the vehicle against a pile of material. Moreover, I have provided a means whereby retraction of said mud flaps may be synchronized with other activities of the driver performed preparatory to such acts, whereby it may be said that the retraction of the mud flaps of my invention is automatic. My basic invention may be powered by any of the several available power means on a truck, such as, but not limited to, pressurized fluid coming from a hydraulic pump such as used to actuate a hoist mechanism, pressurized air coming from a storage tank such as is used in connection with air brakes, or an electrical motor obtaining its energy from the vehicle's electrical system.

While it is possible to have manually operated remotely controlled retraction means, it is also possible to utilize other events which occur to sense the need for retraction of the mud flaps. Some of these include the tilting of a dump body, a positioning of the vehicle's control lever into the reverse drive position, the positioning of the hoist control lever into its dump position, and the application of hydraulic power to a hydraulic pumping hoist.

Once it has been sensed that a need for retraction exists, the various sensing means may directly operate a valve, an electric switch, or a mechanical linkage. Thus, conventional valves and switches may be utilized for this purpose. If a valve is utilized, it may release hydraulic fluid or compressed air to actuate a cylinder. If a switch is utilized, it may actuate a solenoid, a solenoid valve, or an electric motor. These typical forms all convert one type of energy to another; however, all of them have an equivalent mechanical output capable of being utilized to retract the rigid mud flaps.

Accordingly, it is an object of this invention to provide a retractible mud flap mechanism.

It is also an object of this invention to provide a retractible mud flap mechanism which utilizes power other than that delivered by the operator to retract the mud flaps.

It is also an object of this invention to provide a retractible mud flap mechanism combined with a vehicle.

Yet another object of this invention is to provide a mud flap which is powered by pressurized fluid received from a source within a vehicle having wheels.

Yet another object is the provision of a mud flap mechanism which is caused to operate by actuation of the unloading mechanism of a vehicle.

Still another object is the provision of a mud flap mechanism which is cause to operate by the preparation for reverse movement of a vehicle.

Still another object is the provision of a retractible mud flap which is operable by the tilting of a vehicle body.

Another object is the provision of a novel mud flap.

Another object is the provision of a method of controlling retractible mud flaps.

Other objects, features and advantages of this invention will be apparent from the detailed description of the attached sheets of drawings, which illustrate the invention.

On the drawings:

Fig. 2 shows the structure of Figure 1 but with the flaps raised;

Fig. 4 is a schematic diagram of the structure of Figure 1;

Fig. 5 is a schematic diagram of a slightly modified configuration;

Fig. 6 illustrates the rigid mud flap of Figure 1 in detail;

Fig. 7 is a slight variation of the Figure 5 modification; and

Fig. 8 illustrates a second modification of my invention.

As shown on the drawings:

Figure 1:
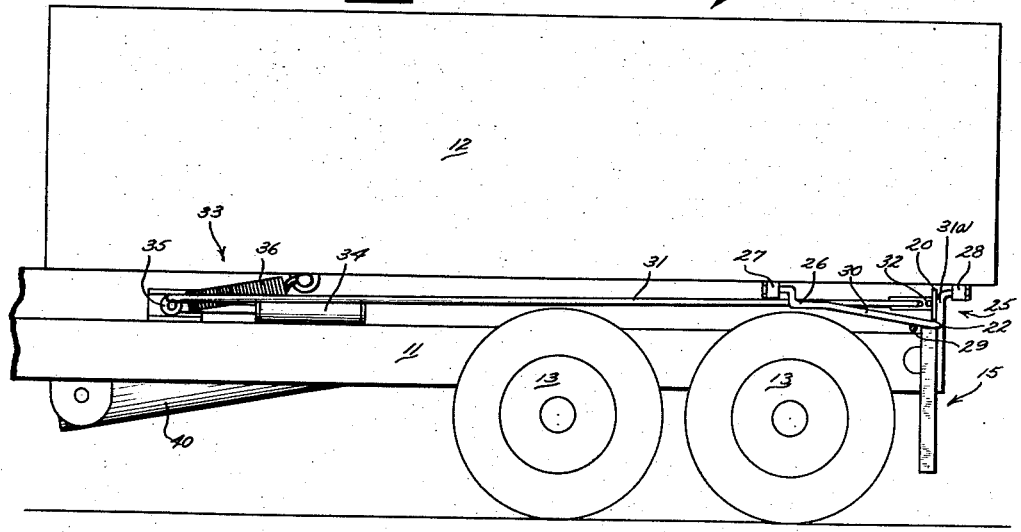
Fig. 1 is a partial side elevational view of a truck having retractible mud flaps in accordance with my invention.

Referring to Figure 1, there is shown a partial side elevational view of a wheeled vehicle generally indicated by the numeral 10. This vehicle may be a dump truck, a dump trailer, or any other wheeled vehicle requiring the use of mud flaps or guards. The vehicle 10 includes the chassis frame 11, a tiltable body 12, together with wheels 13.

At the rear of wheel 13 is a rigid mud flap generally indicated by the numeral 15. By referring to Figure 6, the flap 15 may be seen in greater detail. Thus, the flap 15 comprises a flap deflector plate 16 having vertical side edges 17 to which rigid forwardly directed deflector flanges 18 are attached. This attachment is at the lower portion 17a of the vertical side edges 17. At the upper portion 17b of vertical side edges 17, there are secured supporting means generally indicated at 19 which comprise a pair of ears 20 and 21 extending outwardly or laterally from the upper portion 17b and each ear having at its lower edge a supporting surface 22.

Referring again to Fig. 1, there is shown a supporting means for the mud flap 15, said means being generally indicated at 25. In the instant modification, the supporting means 25 comprises a pair of spaced tracks 26 having any conventional attaching means 27, 28 securing said tracks to the body 12. Of course, the supporting means 25 may be attached to any other portion of the vehicle which is in the proximity of the rear wheel 13. The conventional attaching means 27, 28 shown in Fig. 1 comprises welding, but may also comprise bolting, clamping, or the like. The tracks 26 may have any desired detail configuration, provided that they perform a function equivalent to the tracks illustrated here. It is seen that support surfaces 22 of the mud flap 15 engage the tracks 26 which thereby carry the weight of the rigid mud flap. Track brace 29 may also be included if desired to ruggedize the depending portion of the track.

Between the attaching means 27 and 28 of each track, there is a camming portion 30 which is directed upwardly and forwardly from the point where the mud flap 15 is shown as normally resting. It is not my intent to limit myself to any particular curve except that it is necessary that the curve include both upward and forward components so that the flap may be both tilted about support surfaces 22 and be moved forwardly of the vehicle. As will be seen, the tilting or rocking motion of the flap increases the clearance between the flap and the ground, while the forward motion of the flap removes it from the vicinity of the back end of the truck whereby material being unloaded does not interfere with the raised flap.

I have also provided a stop 31a which is here illustrated as being a portion of the track which engages the ears 20 and 21 of the flap 15 to define a rearward limiting position of the mud flap 15. Of course, it is not necessary that the stop 31a be integral with the track as shown here.

Hingedly secured to the upper portion of the mud flap 15 is a rigid connecting means 31. No particular form of hinging is required between rigid connecting means 31 and the upper portion of flap deflector plate 16; however, freedom of motion or flexibility between these two members is necessary. The relationship of these parts may be seen more clearly in Fig. 4 where it is shown that the connecting means or actuator rod 31 is hinged at 32 to the flap deflector plate 16.

Feferring to Figs. 1 and 4, the numeral 33 generally refers to a power means mechanically connected to the forward end of the actuator rod 31. Thus, there is shown a conventional piston-type actuator 34 which is connected by linkage 35 to the actuator rods 31. A biasing or return spring 36 is connected to the vehicle and to a portion of either the linkage 35 or actuator rod 31 to which the spring applies a rearward force on actuator rod 31.

In a truck having a hoist cylinder 40 for raising the tiltable body 12, there is also a hydraulic pump 41 supplying pressurized hydraulic fluid to hoist cylinder 40. Intermediate the cylinder and the pump there is a fluid valve 42 which has a control lever 43 for actuating the hoist cylinder 40. Thus the lever has at least two positions; the one as shown for tilting the body, and the other as shown in broken lines for lowering the tiltable body. As shown in Fig. 4, the source of fluid pressure may be connected in parallel to both the hoist cylinder 40 and to the piston-type actuator 34. Preferably, the piston-type actuator 34 requires a somewhat lower fluid pressure to be operated than does the hoist cylinder 40. Lock means 44 may be provided to lock the linkage 35 or the actuator rod 31 in a retracted position, so that if it be desired to lubricate the vehicle, change tires, or the like, the mud flap will not interfere.

Figure 3:
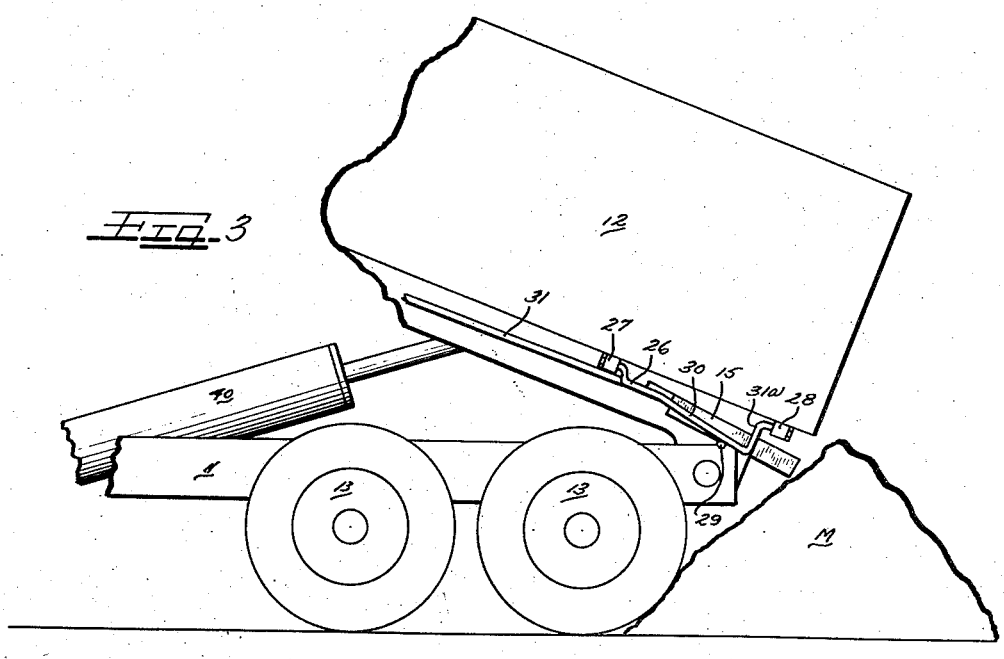
Fig. 3 shows the structure of Figure 1 but with the flaps raised and the body tilted.

It can be seen that when the control lever 43 is placed in a position whereby fluid valve 42 permits fluid under pressure to flow from the pump or source 41 to the cylinder 40 and to the actuator 34, the actuator 34 will cause the actuator rod 31 to be drawn forwardly in opposition to both the force of spring 36 and to the force of gravity acting on the rigid mud flap 15. Since the retracting force is applied at a hinge point 32 which is located above the support surfaces 22, flap rocking will occur about support surfaces 22. As movement of the actuator rod continues in a forwardly direction, the mud flap is upwardly and forwardly cammed by the cam portion 30 of the tracks 26, flanges 18 being supported by brace 29. This movement continues until the mud flap reaches the position shown in Fig. 2. Thereafter, as the pressure continues to build up, the tiltable body tilts as shown in Fig. 3. This sequence of operation presupposes the use of an actuator 34 functioning at a lower pressure than does hoist cylinder 40, as suggested above.

Ordinarily, the capacity of hydraulic pump 41 used in this type of vehicle is quite low. It is therefore the custom of the vehicle operators who are about to dump a load, to set the dump mechanism into operation before the backing of the truck begins. Thus, the flaps are raised almost immediately as soon as backing begins so that the truck may be operated reversely toward a pile of material without engagement of such pile by the mud flaps. Tilting of the dump body still produces no engagement with the pile (M) of material nor does the material being unloaded from the body of the truck interfere with the flaps in a retracted position.

Referring to Fig. 5, there is shown a modification of the structure described. The structure shown in Fig. 5 is identical to that already described herein except that a different power supply or power means 50 has been provided. In this form, the fluid pressure to the piston-type actuator 34 is supplied independently of the pressure to cylinder 40. The source may be either the hydraulic fluid already described, or it may be, as shown, compressed air normally stored in trucks of this type for air-brake uses. Accordingly, power means 50 may comprise the piston-type actuator 34 which is connected to the rigid mud flap 15 by linkage 35 which is biased as before by spring 36. A power source such as the hydraulic pump or air tank 51 is connected to piston-type actuator 34. Intermediate the power source 51 and the actuator 34 there is a fluid valve 52. This fluid valve, like fluid valve 42, has at least two positions. This fluid valve may be manually operated for remote actuation of the mud flap. Preferably, however, lever 53 of the valve 52 is coupled mechanically to the shift or control lever 54 of the vehicle. Control lever 53, if air be used, may dump the used air upon release of the lever so that the spring 36 returns the mud flap to the normal or drive position. On the other hand, the used fluid may be directed to the compressor or pump inlet for reuse.

The structure illustrated in Fig. 5 operates in a generally similar fashion to that already described. The operator positions the control lever to the desired position, either a retracting position if the lever 53 is used solely to control the mud flaps, or a back-up position if the directional control lever 54 of the truck is used to indirectly operate lever 53. Thus if the operator desires to back up, placing the control lever 54 in a reverse driving position causes the mud flaps to retract in the manner already described. Of course, it is recognized that the operator may want to place his control lever 54 in neutral without having his mud flaps returned to the extended position. It is therefore necessary in selecting the fluid valve 52 to employ a valve such as a slide valve which requires the movement of the shift lever 54 to a drive position before extension of the flap or flaps occurs.

Referring to Fig. 7, a variation of the structure of Fig. 5 is shown. In this form, the air from the source or tank 51 is directed by the fluid valve 52 to both sides of the actuator 34. With this arrangement, it will be noted that spring 36 may be omitted and that full power is available to move the piston-type actuator 34 in either direction.

Referring to Fig. 8, there is illustrated a second modification of the power means. The power means of Fig. 8 is generally indicated at 60 and comprises an actuating lever 61 which is pivotally secured at 62 about a vertical axis to the body 12. The actuating lever 61 is secured to the actuator rod 31 as at 63 while any suitable retracting spring 64 is connected at one end to body 12 and at the other end to either actuating lever 61 or actuator rod 31. As shown, an extension spring may be utilized for this purpose. Also comprising part of power means 60 is operating crank 65 which is pivoted about a horizontal axis at 66 at a point also on the body 12. The crank 65 comprises first leg 67 which engages actuating lever 61, and second leg 68 which extends generally horizontally from the horizontal pivot 66. On the chassis frame 11, there is an abutment 69 which engages with the second horizontal leg 68 of the crank 65. Thus, when the body 12 is lowered from the dumping position toward the chassis, abutment 69 engages the leg 68 causing crank 65 to pivot about the axis 66, thereby forcing the first leg 67 against the pivotally secured actuating lever 61. This movement forces the actuator rod 31 to move in a rearward direction, thus extending the flaps to a normal or drive position, and also extends spring 64 thereby storing potential energy therein. When the body 12 begins to raise or tilt from the position shown in Fig. 8, the potential energy in spring 64 draws the actuator rod 31 in a forward direction, thereby retracting the mud flap 15. The movement of spring 64 also causes the actuating lever 61 and the crank 65 to pivot in a direction which is opposite to that already described. A stop 70 may also be provided to limit the movement of crank 65 when it is not engaged with the chassis abutment 69. Thus it can be seen that this form or modification of the invention does not cause retracting of the flaps until the body has actually begun to tilt; but once the tilting has begun, the complete retraction is produced by a rather small angular movement of the body.

It is obvious to those familiar with the art, that equivalent members may be substituted for various components shown herein. It is also possible to take the features described herein in the various modifications and to combine them in various fashions to perform a result which is equivalent to that of my invention. In each of these combinations of structures, the basic methods of automatic control are similar. Thus when the operator is about to cause a condition wherein his rear mud flaps are apt to be damaged, he places a control lever into a certain position. This position is either the lever position causing the backing of the truck or the dumping of the truck. Thus the damage-producing motion of the vehicle may be either the dumping motion or the backing motion. The arrival of the control lever into a preselected position may then be sensed to thereby release energy. The energy thus released may be converted by any conventional means into substantially linear mechanical movement and this movement in turn may be utilized to effect the desired positioning of the mud flap. Of course, the method may be varied to include the conversion of some of the kinetic energy of the tilting body into mechanical movement to effect retraction of the flap. Of course, a portion of the energy directed toward retracting or extending the flap may be stored in a spring, an accumulator, or the like for effecting the opposite flap movement.

Thus it will be understood that numerous modifications and variations may be effected without departing from the scope of the novel concepts of the present invention.

I claim as my invention:

1. A retractible mud flap mechanism for a wheeled vehicle comprising, in combination, a rigid mud flap; means supporting said mud flap, said supporting means having means for attaching said supporting means to the vehicle; stop means at the rear of said supporting means and engageable with said mud flap, said stop means defining a rearward limit of mud flap travel; said supporting means including an upwardly inclined and forwardly directed camming portion forward of said stop means; rigid connecting means hingedly secured to said flap and extending forwardly; and power means connected with said rigid means for alternately applying a forward and a rearward movement to said rigid connecting means; said rigid mud flap engaging with said camming portion and being thereby upwardly and forwardly retractible in response to said forward movement of said rigid connecting means.

2. A retractible mud flap mechanism for mounting rearward of a wheeled vehicle comprising, in combination, a mud flap including a generally flat rigid deflector plate having vertical side edges, a forwardly directed rigid deflector flange secured to the lower portion of each of said side edges, an ear secured to the upper portion of each of said side edges and projecting laterally therefrom, said ear having a generally horizontal support surface; means supporting said ears at said support surface, said supporting means having means for attaching said supporting means to the vehicle; stop means at the rear of said supporting means and engageable with said ears, said stop means defining a rearward limit of mud-flap travel; said supporting means including an upwardly inclined and forwardly directed camming portion forward of said stop means; rigid connecting means hingedly secured to said flap and extending forwardly; and power means connected with said rigid means for alternately applying a forward and a rearward movement to said rigid connecting means; said horizontal support surface of said ears engaging with said camming portion and being thereby upwardly and forwardly retracted in response to said forward movement of said rigid connecting means.

3. A retractible mud flap mechanism for a wheeled vehicle comprising, in combination, a rigid mud flap; a pair of spaced tracks having means for attaching said tracks to the vehicle, said tracks supporting said mud flap in a normally substantially vertical position between said tracks; each of said tracks having a stop adjacent to its rearward end, said stops being engageable with said mud flap and defining a rearward limit of mud-flap travel; each of said tracks having an upwardly inclined and forwardly directed camming portion forward of said stop; rigid connecting means hingedly secured to said flap and extending forwardly; and power means connected with said rigid means for alternately applying a forward and a rearward movement to said rigid connecting means; said rigid mud flap engaging with said camming portion and being thereby upwardly and forwardly retractible in response to said forward movement of said rigid connecting means.

4. A retractible mud flap mechanism for mounting rearward of a wheeled vehicle comprising, in combination, a mud flap including a generally flat rigid deflector plate having vertical side edges, a forwardly directed rigid deflector flange secured to the lower portion of each of said side edges, an ear secured to the upper portion of each of said side edges and projecting laterally therefrom, said ear having a generally horizontal support surface; a pair of spaced tracks having means for attaching said tracks to the vehicle, said tracks supporting said mud flap in a normally substantially vertical position between said tracks; each of said tracks having a stop adjacent to its rearward end, said stops being engageable with said mud flap and defining a rearward limit of mud-flap travel; each of said tracks having an upwardly inclined and forwardly directed camming portion forward of said stop; rigid connecting means hingedly secured to said flap and extending forwardly; and power means connected with said rigid means for alternately applying a forward and a rearward movement to said rigid connecting means; said horizontal support surface of said ears engaging with said camming portion and being thereby upwardly and forwardly retracted in response to said forward movement of said rigid connecting means.

5. In combination with a vehicle having rear wheels, a rigid mud flap; support means secured to said vehicle above and adjacent to one of the rear wheels and supporting said mud flap; stop means at the rear of said support means and registering with said mud flap, said stop means defining a rearward limit of mud-flap travel; said support means including an upwardly inclined and forwardly directed camming portion forward of said stop means; rigid connecting means secured to said flap and extending forwardly; and power means for alternately applying a forward and a rearward movement to said rigid connecting means; said rigid mud flap engaging with said camming portion and upwardly and forwardly retracting from a normal position in response to said forward movement of said rigid connecting means, and returning to said normal position in response to said rearward movement.

6. In combination with a vehicle having rear wheels, a rigid mud flap; a pair of spaced tracks secured to said vehicle above and adjacent to one of the rear wheels and supporting said mud flap; each of said tracks having a stop adjacent to its rear end; and an upwardly inclined and forwardly directed camming portion forward of said stop; a rigid actuater rod secured to the upper part of said flap and extending forwardly; and means for alternately applying a forward and a rearward movement to said rod; said rigid mud flap engaging with said camming portion and retracting upon said forward movement of said rod; said stop registering with said mud flap to define a rearward limit of mud-flap travel.

7. In combination with a vehicle having rear wheels and unloading mechanism connected to a source of pressurized fluid, a rigid mud flap; support means secured to said vehicle above and adjacent to one of the rear wheels and supporting said mud flap; stop means at the rear of said support means and registering with said mud flap, said stop means defining a rearward limit of mud-flap travel; said support means including an upwardly inclined and forwardly directed camming portion forward of said stop means; rigid connecting means secured to said flap and extending forwardly; and power means for alternately applying a forward and a rearward movement to said rigid connecting means; said rigid mud flap engaging with said camming portion and upwardly and forwardly retracting from a normal position in response to said forward movement of said rigid connecting means, and returning to said normal position in response to said rearward movement; said power means including a piston-type actuator mechanically secured to said vehicle and connected to said source of pressurized fluid, and linkage joining the piston of said actuator with said rigid connecting means, said linkage being spring-biased to produce said rearward movement, whereby application of fluid pressure to said unloading mechanism also effects said forward retracting of said mud flap and stores potential energy in the spring of said spring-biased linkage for said subsequent rearward movement.

8. In combination with a vehicle having rear wheels, and a source of pressurized fluid, a rigid mud flap; support means secured to said vehicle above and adjacent to one of the rear wheels and supporting said mud flap; stop means at the rear of said support means and registering with said mud flap; said stop means defining a rearward limit of mud-flap travel; said support means including an upwardly inclined and forwardly directed camming portion forward of said stop means; rigid connecting means secured to said flap and extending forwardly; and power means for alternately applying a forward and a rearward movement to said rigid connecting means; said rigid mud flap engaging with said camming portion and upwardly and forwardly retracting from a normal position in response to said forward movement of said rigid connecting means, and returning to said normal position in response to said rearward movement; said power means including a piston-type actuator mechanically secured to said vehicle and connected to said source of pressurized fluid, and linkage joining the piston of said actuator with said regid connecting means, whereby application of fluid pressure to one side of said piston effects said upward and forward retracting of said mud flap against the force of gravity.

9. In combination with a vehicle having rear wheels, a source of pressurized fluid, and a control lever with at least a retracting and an extending position, a rigid mud flap; support means secured to said vehicle above and adjacent to one of the rear wheels and supporting said mud flap; stop means at the rear of said support means and registering with said mud flap, said stop means defining a rearward limit of mud-flap travel; said support means including an upwardly inclined and forwardly directed camming portion forward of said stop means; rigid connecting means secured to said flap and extending forwardly; and power means for alternately applying a forward and a rearward movement to said rigid connecting means; said rigid mud flap engaging with said camming portion and upwardly and forwardly retracting from a normal position in response to said forward movement of said rigid connecting means, and returning to said normal position in response to said rearward movement; said power means including a fluid valve, a piston-type actuator mechanically secured to said vehicle and connected via said valve to said source of pressurized fluid, and linkage joining the piston of said actuator with said rigid connecting means, said valve being under the control of said control lever and being responsive to said retracting position of said lever whereby it admits fluid pressure to one side of said piston to effect said upward and forward retracting of said mud flap against the force of gravity, and being responsive to said extending position whereby it controls fluid to thereby effect the return of the mud flap to the position from which it was retracted.

10. In combination with a vehicle including a chassis frame, rear wheels, and a tiltable body, the improvement comprising a rigid mud flap; support means secured to said vehicle above and adjacent to one of the rear wheels and supporting said mud flap; stop means at the rear of said support means and registering with said mud flap, said stop means defining a rearward limit of mud-flap travel; said support means including an upwardly inclined and forwardly directed camming portion forward of said stop means; rigid connecting means secured to said flap and extending forwardly; and power means for alternately applying a forward and a rearward movement to said rigid connecting means; said rigid mud flap engaging with said camming portion and upwardly and forwardly retracting from a normal position in response to said forward movement of said rigid connecting means, and returning to said normal position in response to said rearward movement; said power means including an actuating lever pivotally secured to said tiltable body about a vertical axis and drivingly connected to said rigid connecting means, a retracting spring secured to said body and biasedly urging said connecting means to effect one of said movements, an operating crank pivotally secured to said tiltable body about a horizontal axis and having first and second legs, said first leg engaging said actuating lever, and an abutment on said vehicle chassis engageable with said second leg to effect pivoting of said crank and of said actuating lever in opposition to the biasing force of said retracting spring, thereby effecting the other of said movements and storing potential energy for the next of said one of said movements.

11. In combination with a vehicle having rear wheels, a rigid mud flap; support means secured to said vehicle above and adjacent to one of the rear wheels and supporting said mud flap; stop means at the rear of said support means and registering with said mud flap, said stop means defining a rearward limit of mud-flap travel; said support means including an upwardly inclined and forwardly directed camming portion forward of said stop means; rigid connecting means secured to said flap and extending forwardly; power means for alternately applying a forward and a rearward movement to said rigid connecting means; said rigid mud flap engaging with said camming portion and upwardly and forwardly retracting from a normal position in response to said forward movement of said rigid connecting means, and returning to said normal position in response to said rearward movement; and lock means carried by said vehicle and engageable with a movable portion of one of said connecting and power means whereby said flap may be locked in a desired position.

References Cited in the file of this patent

UNITED STATES PATENTS

| | | |
|---|---|---|
| 1,754,147 | Cookson | Apr. 8, 1930 |
| 2,431,588 | Sharpe | Nov. 25, 1947 |
| 2,653,846 | Wiley | Sept. 29, 1953 |
| 2,721,760 | Lapham et al. | Oct. 25, 1955 |

FOREIGN PATENTS

| | | |
|---|---|---|
| 775,298 | France | Oct. 8, 1934 |